No. 819,343. PATENTED MAY 1, 1906.
E. M. DAY.
BATH TUB.
APPLICATION FILED OCT. 6, 1902. RENEWED SEPT. 29, 1905.
2 SHEETS—SHEET 1.
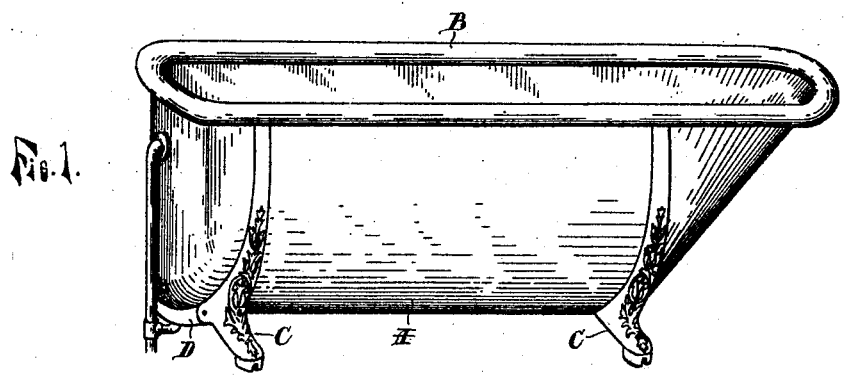
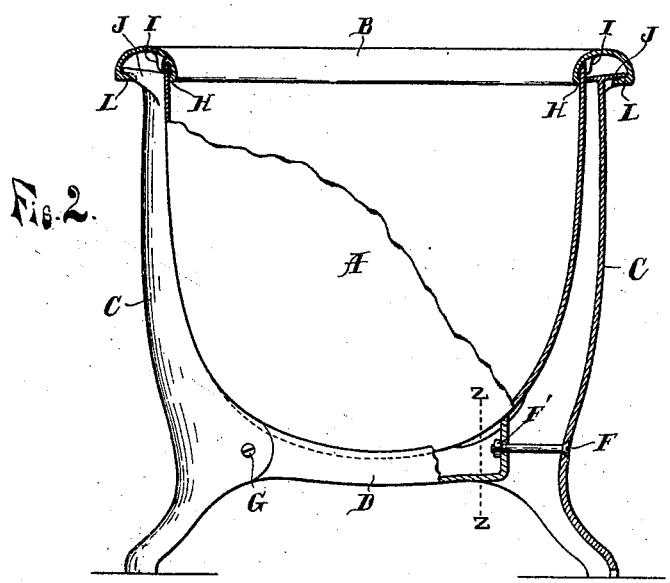
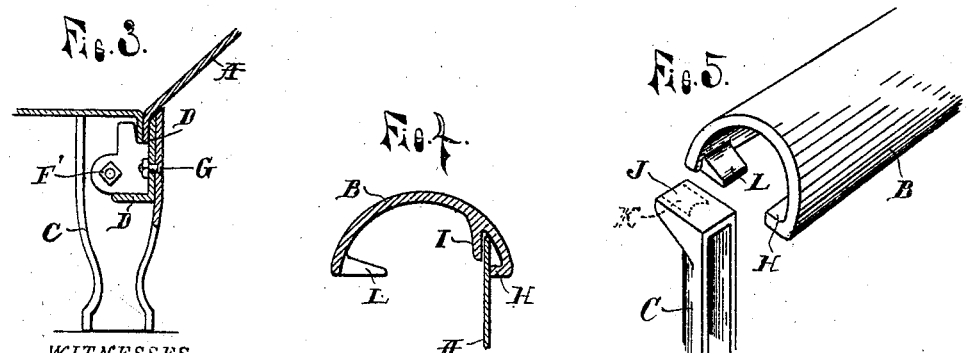
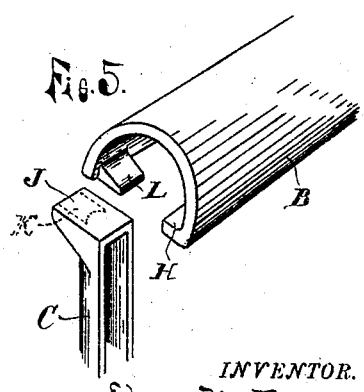
WITNESSES.
Lewis E. Flanders
Thomas L. Longstaff
INVENTOR.
Elmer M. Day.
By
Attorneys.

No. 819,343. PATENTED MAY 1, 1906.
E. M. DAY.
BATH TUB.
APPLICATION FILED OCT. 6, 1902. RENEWED SEPT. 29, 1905.
2 SHEETS—SHEET 2.
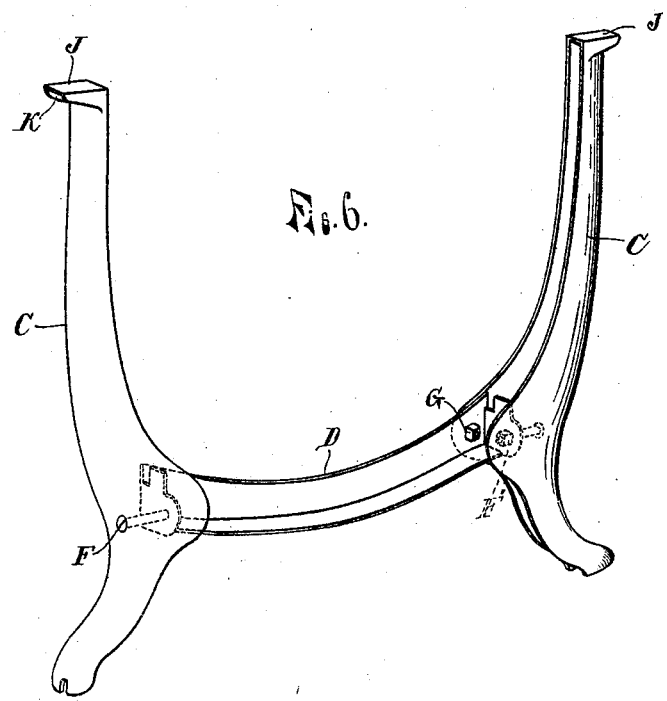
WITNESSES. INVENTOR.

UNITED STATES PATENT OFFICE.

ELMER M. DAY, OF DETROIT, MICHIGAN.

BATH-TUB.

No. 819,343. Specification of Letters Patent. Patented May 1, 1906.

Application filed October 6, 1902. Renewed September 29, 1905. Serial No. 280,690.

*To all whom it may concern:*

Be it known that I, ELMER M. DAY, a citizen of the United States of America, residing at Detroit, in the county of Wayne and State of Michigan, have invented certain new and useful Improvements in Bath-Tubs, of which the following is a specification, reference being had therein to the accompanying drawings.

This invention relates to new and useful improvements in bath-tubs, and has for its object to make a metallic rim for bath-tubs which shall be entirely separate from the sheet-metal tub, but securely held and locked in position thereon by the supporting-legs.

To this end the invention consists in the peculiar construction of the metallic rim and in the means for locking it in position upon a tub without the use of bolts or rivets, and consists, further, in the peculiar construction of the supporting-legs and transverse supporting-bars whereby the parts are easily assembled and securely locked together and held in place in a simple and efficient manner to obtain a rigid structure, all as more fully hereinafter described, and shown in the accompanying drawings, in which—

Figure 1 is a perspective view of a bath-tub embodying my invention; Fig. 2, an end elevation, partly in section; Fig. 3, a section on the line $z\ z$, Fig. 2; Fig. 4, a section through the rim, showing the lugs for holding the upper edge of the sheet-metal tub in place, and Fig. 5 a perspective view of a section of the rim and leg detached. Fig. 6 is a perspective view of the legs and connecting-bar of a bath-tub detached from the tub-body. Fig. 7 is a perspective view of the connecting-bar detached.

As shown in the drawings, A is the sheet-metal tub; B, the rim, preferably cast hollow, as shown; C, the legs, and D the transverse supporting-bars, each connecting a pair of legs at the opposite ends of the tub by means of the bolts F passing through apertures in the ends of said bars and legs, respectively, and G represents short bolts passing through apertures in the sides of the bars and legs for securely locking the parts together after they have been drawn up to the desired tension by means of the bolts F.

H is a horizontal flange or projection extending all around the inner edge of the rim B and preferably formed integral therewith, and I represents a series of depending lugs formed on the inner concave side of the rim and between which lugs and flange the top of the sheet-metal tub is inserted to make a smooth, tight, and invisible joint.

J represents lateral extensions formed on the upper ends of the legs C integral therewith, which extensions are cut out on their under side to form seats K, adapted to engage the horizontal inwardly-extending lugs L on the rim, and thus securely lock the tub, rim, and legs together at their upper end without the use of any other securing means.

D is a transverse bar (L-shaped in cross-section, as shown in Fig. 3) uniting the legs C at the head of the tub by means of the bolts F passing through apertures in the ends of said bar and the legs and set up with nuts F' on the inside, the squared ends of said bar being notched out, as shown, to receive the flanged meeting ends of the tub, as shown in Fig. 3. A transverse bar similar to the bar D unites the legs C at the opposite end of the tub in a similar manner. It will thus be seen that the rim is securely locked in place and the entire tub assembled in a ready and efficient manner with the use of but eight bolts, and by making the rim out of iron it can be enameled like the rest of the tub and will not warp and crack like a wooden rim and besides which the metallic rim expands and contracts equally with that of the metallic body.

Having thus fully described my invention, what I claim is—

1. In a bath-tub, the combination with the tub, of the concaved rim thereon, inwardly-extending lugs on said rim, legs formed with lateral offsets at their upper ends engaging said lugs and transverse bars each connecting their respective pair of legs.

2. In a bath-tub, the combination with the tub-body, of a detachable metallic rim formed with lugs engaging said tub-body, inwardly-extending lugs on said rim and legs formed with lateral extensions at their upper ends engaging said lugs and forming the means for supporting the tub and detachably locking the rim upon the tub.

3. In a bath-tub, the combination of a rim formed with a shoulder around its inner edge, lugs depending from said rim adjacent to said shoulder, between which the upper edge of the tub-body is brought into engagement with the rim, lugs on the outer edge of said rim, legs adapted to be brought into engagement with said last-mentioned lugs and transverse bars connecting said legs near their lower ends.

4. In a bath-tub, the combination of a metallic rim concavo-convex in cross-section, an outwardly-extending flange around the inner edge of said rim, downwardly-depending lugs adjacent to said flange between which flange and lugs the upper edge of the tub-body is adapted to be inserted, inwardly-extending lugs on the outer edge of said rim, legs formed with lateral offsets adapted to be brought into engagement with said last-mentioned lugs and transverse bars connecting said legs near their lower ends across the bottom of the tub at or near the ends thereof.

5. In a bath-tub, the combination with the tub-body, of the rim B and legs C engaging said rim, the transverse bars D, at the opposite ends of the tub, the bolts F adjustably connecting each pair of legs with their respective bar and the bolts G for locking the parts together when in their adjusted position.

6. In a bath-tub, the combination with the tub-body, of a rim engaging said body, legs detachably engaging said rim and transverse bars each connecting a pair of legs and formed with cut-out portions at their ends for the reception of the securing-flanges for the ends of the tub.

In testimony whereof I affix my signature in presence of two witnesses.

ELMER M. DAY.

Witnesses:
   OTTO F. BARTHEL,
   ARTHUR C. LLOYD